United States Patent Office 3,300,034
Patented Jan. 24, 1967

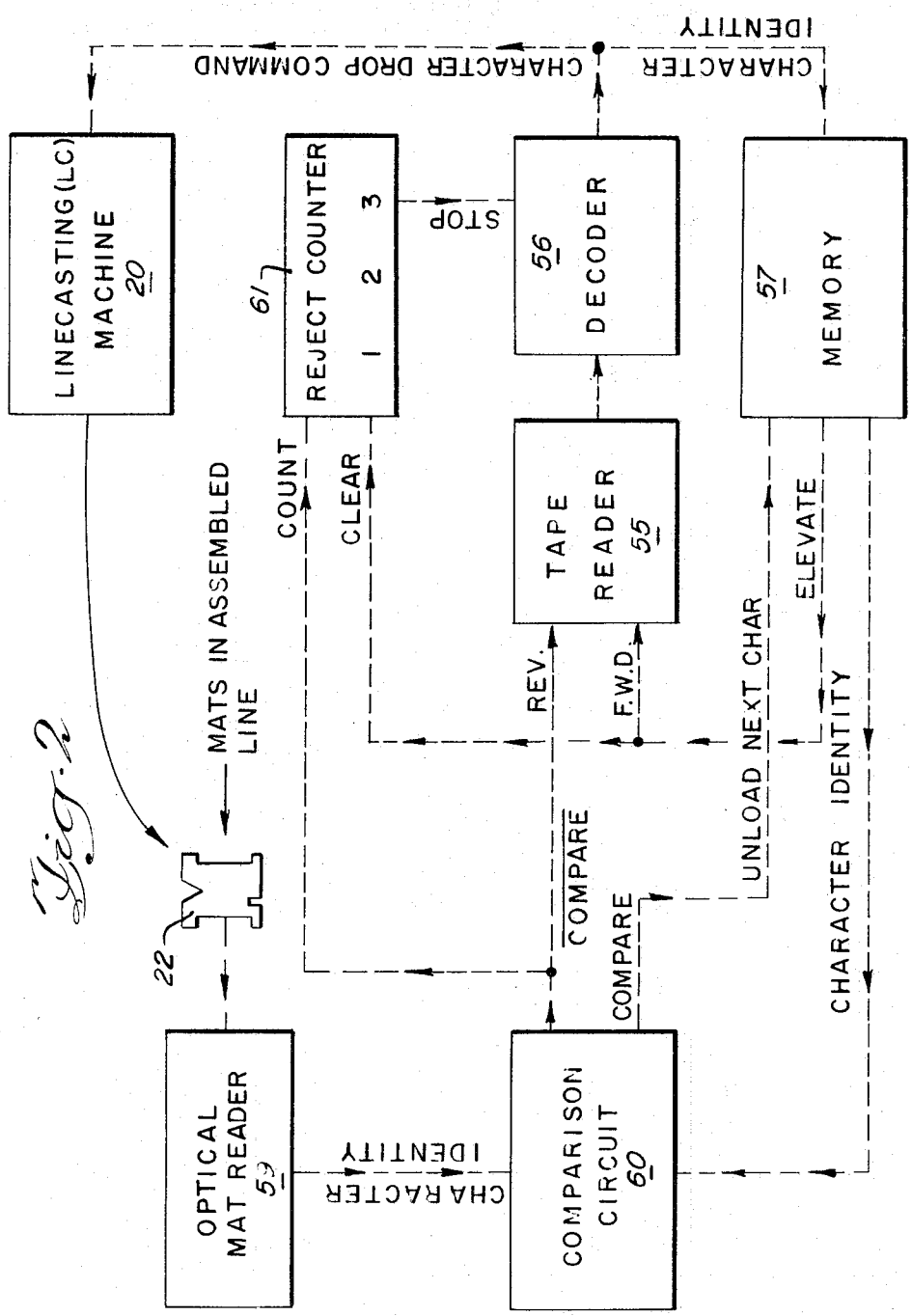

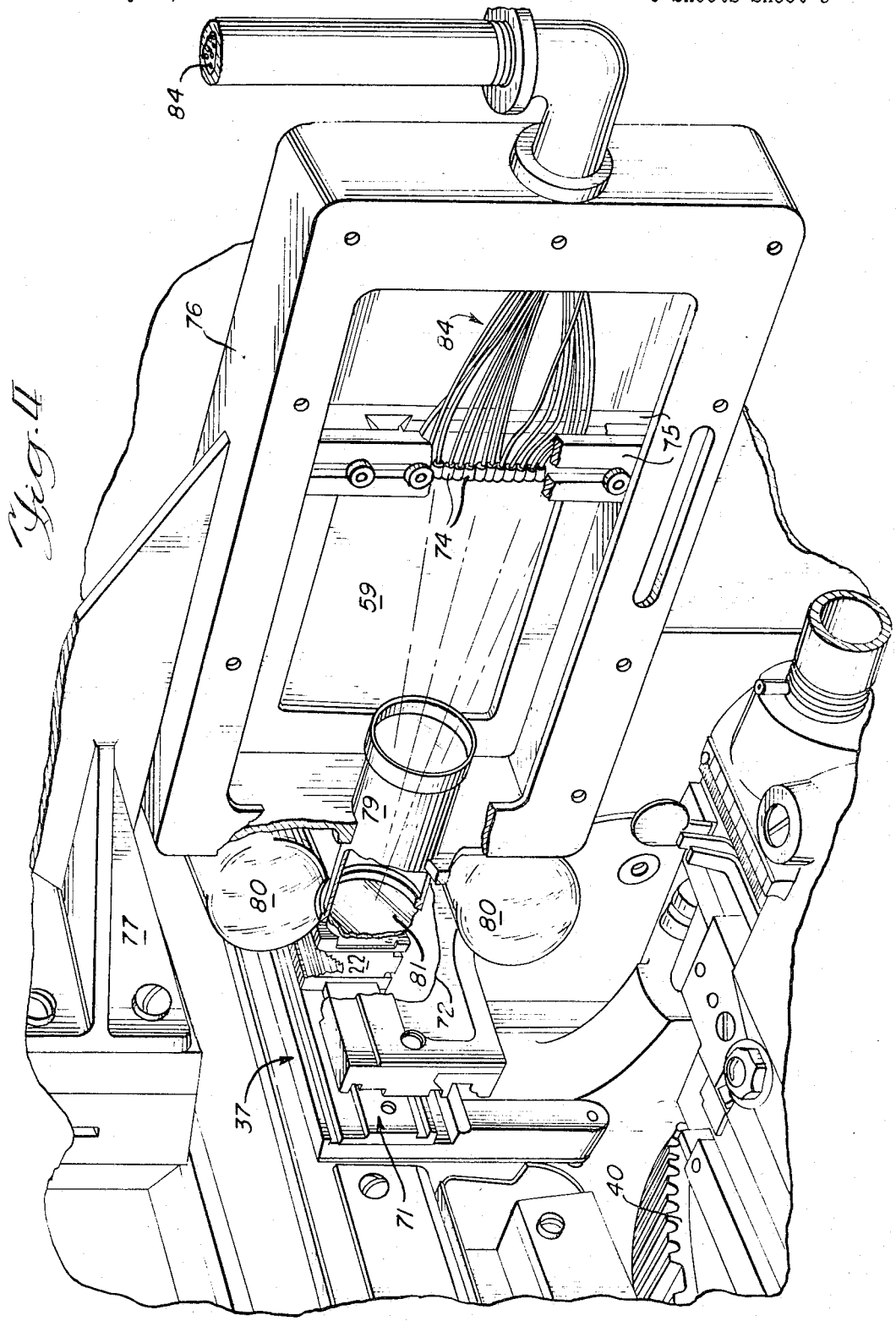

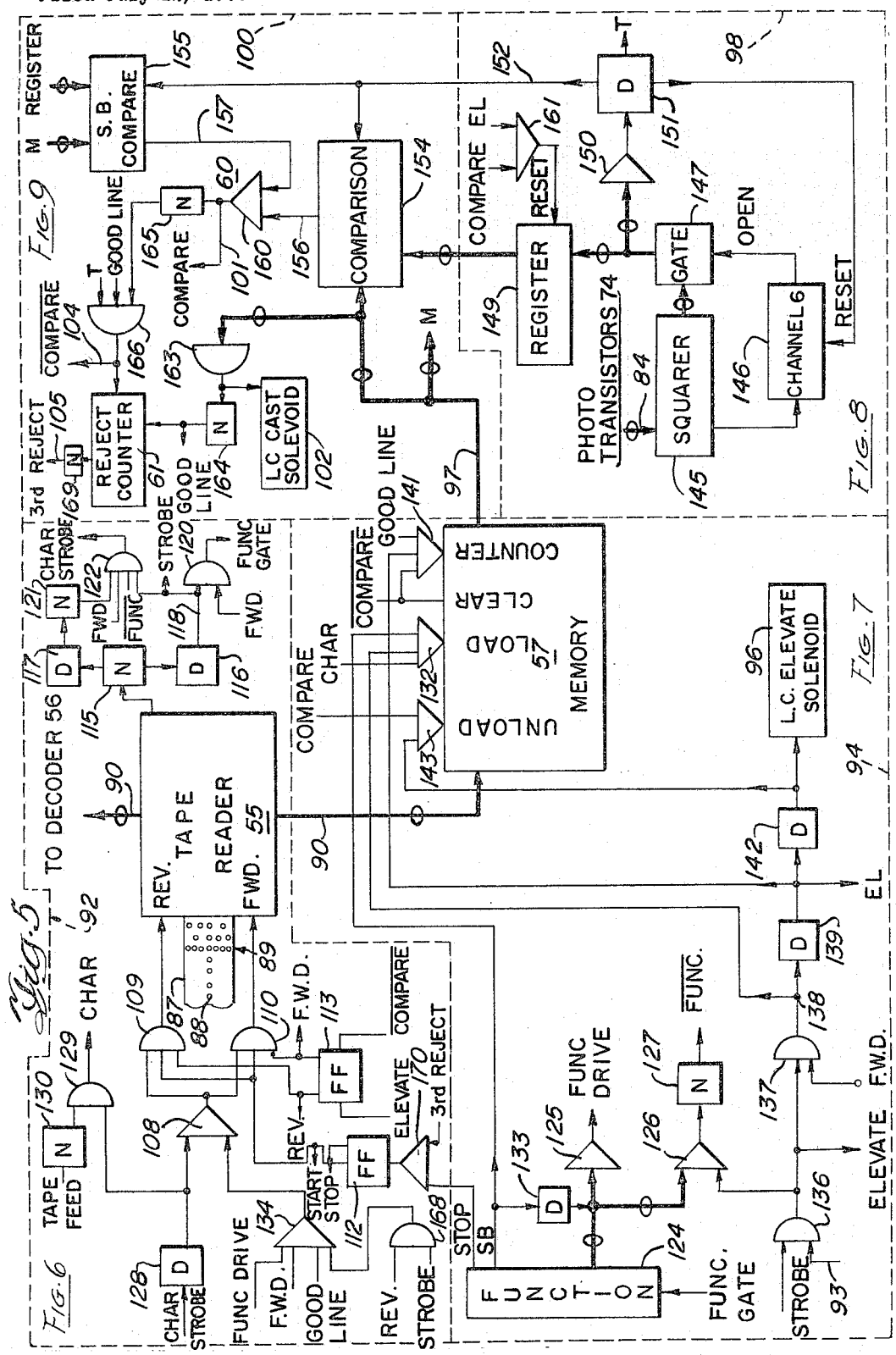

3,300,034
LINECASTING CONTROL SYSTEM
John E. Kleboe, Chicago, and Martin E. Runyan, Riverdale, Ill., assignors to R. R. Donnelley & Sons Company, a corporation of Delaware
Filed July 12, 1965, Ser. No. 471,070
37 Claims. (Cl. 199—11)

This invention relates to a control system for a line casting machine, and more particularly to a control system which causes a line casting machine to operate in a modified manner when an error is detected in a line of matrixes assembled by the machine.

As is well known in the art, a line casting machine which assembles a line of character carrying matrixes and casts a slug of type from the assembled line may be controlled either manually by an operator or automatically by a punched program tape. When controlled automatically, a tape reader converts punched information on a paper tape into a plurality of signals which are coupled to inputs of a decoder unit. The output of the decoder controls solenoids which actuate the matrix release mechanism of the line casting machine.

Matrixes representative of characters are released from a magazine storage area in response to the selection of a character by the automatic or manual depression of a key. An assembled line of matrixes may have a variety of errors which are not detected until proofs of the cast type are prepared.

Some attempts have been made to provide a malfunction detector for a line casting machine. Typical systems have projected photobeams across the path of released matrixes in order to provide a parity, i.e., numerical, check on the machine. If the number of keys depressed is not equal to the number of matrixes released by the machine, an error signal is generated for shutting down the machine. A parity check merely indicates when a matrix is missing, or an extra matrix is released by the machine.

There are many other causes of errors which cannot be detected by a simple parity check. For example, a relatively common type of error occurs when a matrix is stored in the wrong channel in the storage magazine. When the character corresponding to that channel is selected, the wrong matrix is released by the machine. A similar error also results when a matrix is released from the wrong magazine.

Many other errors are possible, even when the correct matrix is selected. For example, the assembling mechanism may transpose the order of the matrixes, or assemble a spaceband in the wrong position. Even when the correct matrix is located in the correct position, the wrong rail may be aligned by the assembling mechanism.

Although a line of matrixes may be assembled with an error, this does not indicate that the line casting machine is seriously malfunctioning. To shut down the machine when a single error is detected is unnecessary since the machine will in most instances reassemble the line correctly, if given a chance. For example, it is not uncommon for the distributing mechanism to drop a matrix into a storage channel for matrixes of a different character. Although this error results in a line assembled with the wrong matrix, in most instances the machine would not duplicate the error if the line was reassembled. A serious machine malfunction which would justify shutting down the machine is only indicated when a particular line cannot be assembled correctly after a number of attempts.

The potential advantages of complete automatic control of a line casting machine cannot be realized unless the slug of type delivered to the storage galley is error free. In accordance with the present invention, a control system for a line casting machine is provided which compares the assembled matrixes with information representing the desired characters.

A principal object of this invention is to provide a control system for eliminating errors in a line casting machine.

Another object of this invention is to provide a control system which compares the actual character of a released matrix with the character desired.

One feature of this invention is the provision of a control system which automatically prevents an assembled line of matrixes from being cast when an error is detected.

Another feature of this invention is the provision of a control system which automatically reassembles a line of matrixes when an error is detected in an assembled line.

Yet another feature of this invention is the provision of a control system for a line casting machine in which the actual character of each assembled matrix is compared with the character selected. If the compared characters are identical, the slug of type is cast. If the characters do not compare, the assembled matrixes are disposed of and the line is reset.

Still another feature of this invention is the provision of a control system for a line casting machine in which individual matrixes are coded with digital information representative of the character thereof. A digital reading system is located along the path between the assembling mechanism and the casting mechanism. The digital information on each matrix is read simultaneously as that matrix is conveyed along the path past a light source and a light sensitive signal generating means.

Yet a further feature of this invention is the provision of a control system for a line casting machine in which a tape reading machine generates signals representative of selected characters on a program tape. These signals, which control the assembly of matrixes by the machine, are stored in a memory unit. Each matrix has indicia thereon representative of its actual character. Signals representative of the indicia on assembled matrixes is compared with the signals stored in the memory. If the compared signals are not identical, the assembled line of matrixes is discarded and the line is reassembled automatically.

Further features and advantages of this invention will be apparent from the following specification and from the drawings, in which:

FIGURE 2 is a block diagram of a control system embodying the invention;

FIGURE 4 is a perspective diagram, partly in section, illustrating the photo transistor system for reading indicia on an assembled line of matrixes;

FIGURE 5 is a block diagram illustrating the control system in more detail;

Figure 1:
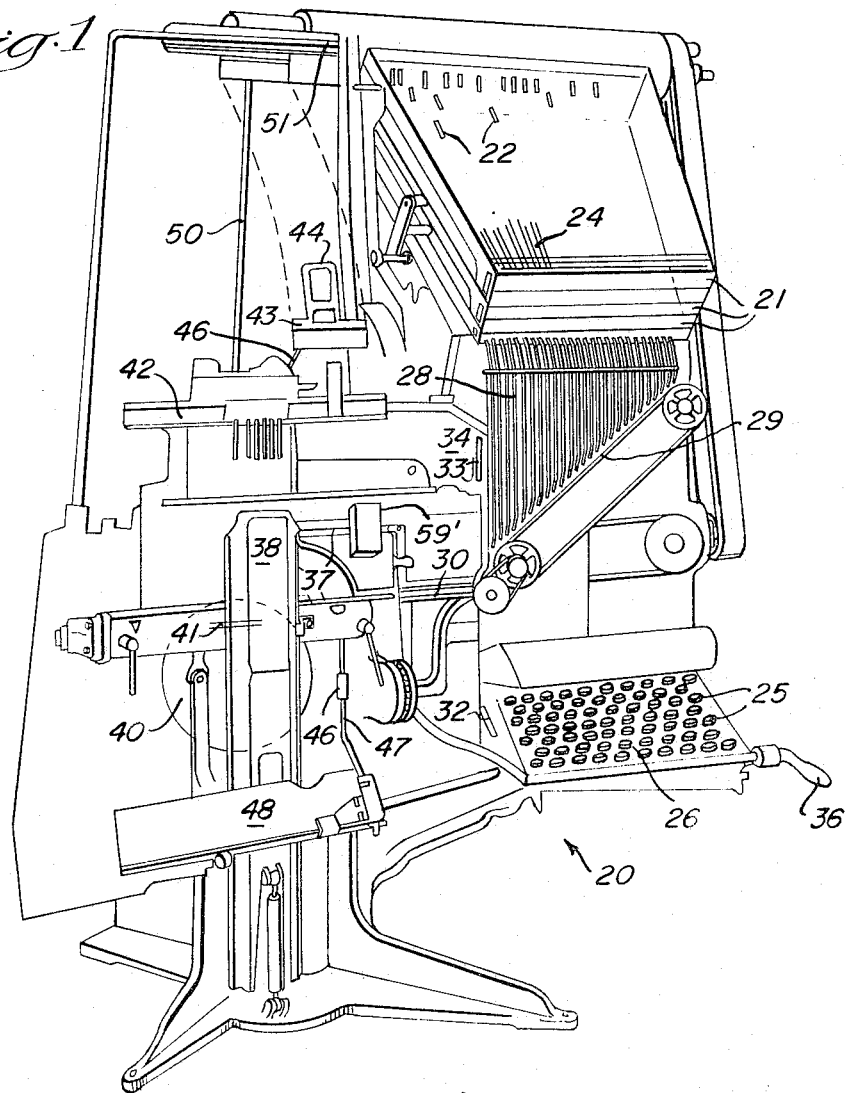
FIGURE 1 is a diagrammatic perspective representation of a line casting machine, including a portion of the applicants' control system.

While an illustrative embodiment of the invention is shown by the drawing and will be described in detail herein, the invention is susceptible of embodiment in several different forms, and it should be understood that the present disclosure is to be considered as an exemplification of the principles of the invention and is not intended to limit the invention to the embodiment illustrated. The scope of the invention will be pointed out in the appended claims.

*General operation*

In FIGURE 1, a line casting (LC) machine 20 is diagrammatically illustrated. One or more magazines 21 store individual matrixes or mats 22, from which a slug of type is cast by the machine. Matrixes 22 are stored by magazine 21 in individual channels 24 representative of individual characters. Matrixes may be selected for assembly in a line by the depression of keys 25 on a keyboard 26.

The selection of a character, either by a manual depression of an individual key 25, or by an automatic operation which duplicates key actuation, causes a mat to be released from the corresponding channel 24 in magazine 21. The released mat falls along guide 28 onto a moving assembler belt 29. At the lower end of belt 29, the mats are assembled in a line on an assembling elevator mechanism 30.

The depression of a spaceband (SB) key 32 releases a spaceband 33 from spaceband box 34. The falling spaceband is then assembled with the matrixes by assembling mechanism 30.

After a complete line of matrixes and spacebands has been assembled, elevator lever 36 is either manually or automatically operated to cause assembling elevator 30 to raise the assembled line to a vertical position corresponding to the level of a delivery slide 37. The assembled line is thereafter moved generally horizontally by slide 37 and transferred to a first elevator 38.

At first elevator 38, the assembled line is lowered to a casting position in front of a mold disc 40. After the assembled line is justified, molten metal is forced from a slot 41 into the casting edge of the assembled matrixes.

After the metal cools, first elevator 38 raises the assembled line to a vertical position level with a slide 42. The assembled line is conveyed onto a hand 43 of a second elevator 44, which at this time is level with slide 42.

While the assembled line is being conveyed to second elevator 44, mold disc 40 rotates to a position where a slug ejector forces the cast slug 46 out of slot 41 into a slide 47. At the bottom of slide 47, the slugs are stacked in a galley 48 before being removed for the printing operation.

Line casting machine 20 also disassembles the assembled line of matrixes and distributes the matrixes to the proper storage locations. An arm 50 raises hand 43 of second elevator 44 and the matrixes to the level of a distributing mechanism 51. The spacebands 33, which have no teeth, do not cling to hand 43, but remain at the level of slide 42. A metal finger (not illustrated) engages the spacebands and transfers them to their storage location in spaceband box 34. The individual matrixes have teeth 52, seen in FIGURE 3, located along a V-shaped opening at the top of each matrix. The matrixes cling by teeth 52 to a bar in distributing mechanism 51. A screw arrangement conveys these matrixes down the bar and along the tops of channels 24 in the magazine. Different teeth on the bar are cut away at each channel entrance. When an individual matrix reaches the channel corresponding to its character, the matrix is no longer supported by its teeth, and it falls into its channel.

The foregoing description outlines the usual operation of a line casting machine. More detailed information regarding the machine and its operation is available from many sources. See for example, "Linotype Machine Principles," copyright 1940 by the Mergenthaler Linotype Company, Brooklyn, New York.

As previously explained, the matrixes and spacebands assembled in assembling elevator 30 may have errors due to a variety of causes. The control system described hereinafter modifies the above series of operations when an assembled line has an error.

*General control system*

In FIGURE 2, a block diagram of the control system is illustrated. Control information for the line caster is provided as in the form of a punched paper tape. A tape reader 55 has a plurality of output signals, usually digital in form, representative of a character on the punched paper tape. The output signals from tape reader 55 are converted by a decoder unit 56 into character drop command signals which are coupled to line casting machine 20. Each key mechanism on the keyboard of the machine is connected to a solenoid energized by the drop command signal corresponding to the character of that key. The energized solenoid actuates the key mechanism, releasing the corresponding mat from the storage magazine.

In accordance with the present invention, the outputs from tape reader 55 and decoder 56 are also coupled to a memory 57. As line casting machine 20 assembles mats 22 in a line, information identifying the characters for that line is stored by memory 57.

Each mat carries indicia for identifying the character of the mat. As the assembled line of mats are conveyed to the casting mechanism, they pass an optical mat reader 59 located along the conveying path. For example, the optical mat reader may be located along delivery slide 37 at position 59', illustrated by broken lines in FIGURE 1.

Reader 59 generates a character identity signal representative of the indicia on the mats conveyed thereby. This signal is coupled to a comparison circuit 60.

Each of the character identity signals from reader 59 is compared with the corresponding character identity signal from memory 59. A COMPARE signal is generated each time these two signals match, indicating that the assembled character is identical with the selected character. The last COMPARE signal causes the assembled mats to be cast into a slug of type.

If the two signals from reader 59 and memory 57 do not match, a $\overline{\text{COMPARE}}$ signal is generated. This signal blocks the cast mechanism to prevent a slug from being formed from the assembled mats.

The $\overline{\text{COMPARE}}$ signal is also coupled to reader 55 and to a reject counter 61. This signal causes tape reader 55 to reverse (REV) direction and return to the start of the line in which the error occurred. The tape reader stops at this point, and rereads the line in a forward direction, causing the line of mats to be reassembled by machine 20. The $\overline{\text{COMPARE}}$ signal also causes the first unsuccessful attempt to assemble an error-free line to be registered by reject counter 61.

As the reassembled line of mats is conveyed past reader 59, the indicia thereon are again compared with the signals stored in memory 57. If the reassembled line has no errors, the line is cast and a new line set. However, if the line again has an error, the $\overline{\text{COMPARE}}$ signal causes the second unsuccessful attempt to be registered by reject counter 61. Furthermore, the assembled line is not cast, and another attempt is made.

After a predetermined number, as three, of unsuccessful attempts to assemble a line, reject counter 61 generates a stop signal which shuts down the system.

While the control system is especially advantageous when used in conjunction with a tape controlled line caster, it is not to be limited to such use, but may also be used with a manual input machine. For example, manual depression of a key on machine 20 can generate the character identity signal stored in memory 57.

*Matrix coding system*

Figure 3:
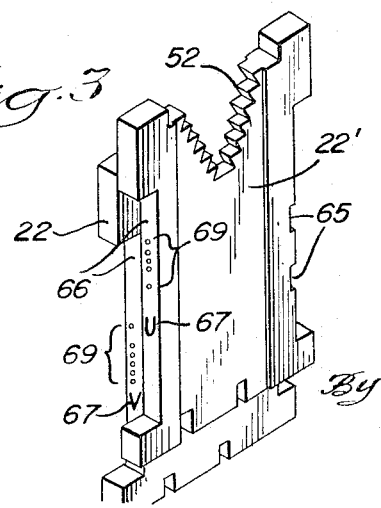
FIGURE 3 is a perspective view of a pair of matrixes, having indicia thereon according to the invention.

In FIGURE 3, one specific embodiment of indicia suitable for coding individual matrixes 22 is illustrated. On the casting side of the matrix, two casting edges 65 have indented characters therein for casting the slug of type. Two edges 65 are often provided on each matrix, carrying two styles of the same character. These matrixes may be assembled either along the upper or lower rail by assembling elevator 30, to form a continuous casting edge. In FIGURE 3, matrix 22' is illustrated in the upper rail position, and the other matrix 22 in the lower rail position.

On the reference side 66 of the matrixes, conventional reference markings 67 are provided to identify the character of the matrix. In addition to marking 67, indicia 69 are provided which further identify the character of the matrix.

Indicia 69 are formed from a plurality of bits arranged in a digital code. Each bit has two possible conditions, e.g., 0 or 1, indicated by the presence or absence of a light reflective dot. The reflective code may be formed from dots of white paint carried on a dull finished surface of side 66. Each individual matrix is coded with indicia 69 which uniquely identifies the character thereon. The spaceband need not be so identified.

The extent of the code alongside 66 is less than the space between rails. As a result, the bits forming indicia 69 do not overlap when adjacent matrixes are assembled along the upper and lower rail, as illustrated in FIGURE 3.

In FIGURE 4, the optical mat reader 59 is illustrated. An assembled line of matrixes 22 is conveyed by delivery slide mechanism 37 through a delivery channel 71 toward mold disc 40. A portion 72 of channel 71 is cut away, allowing the reference side of the assembled matrixes to be viewed by reader 59.

A plurality of photo transistors 74 are mounted between vertical plates 75. This structure is contained within a light-tight housing 75, illustrated in FIGURE 4 with the cover removed, attached by a flange 77 to the linecasting machine. A lens assembly 79 extends through the wall of housing 76 and into close proximity with open portion 72 of the delivery channel.

Two light sources 80 project a light beam through portion 72 and against the reference side of the line of matrixes conveyed through channel 71. A lens 81 is located at one end of assembly 79.

As each matrix passes lens 81, an image of the indicia thereon is focused against photo transistors 74. Each photo transistor corresponds to a particular bit location, or channel, along the reference side of the matrix, and generates a signal if a dot is present. Due to inversion in the lens system, the upper group of photo transistors 74 generates signals corresponding to the indicia on matrixes assembled along the lower rail. Conversely, the lower group of photo transistors 74 forms a signal corresponding to the indicia on matrixes assembled along the upper rail. A plurality of electrical conductors 84 couple these signals to the other circuitry of the control system.

*Detailed control system*

The following conventions will be used throughout the remaining figures to identify basic logical blocks. OR gates are indicated by triangles, while AND gates are indicated by semicircles. A rectangle with an N indicates a NOT gate, which inverts the polarity of the digital pulse coupled thereto. Rectangles labeled with a D indicate delay gates, which provide different delay times as disclosed in the specification. The DELAY units may be formed from unistable multivibrators, providing single shot time delay. Rectangles labeled F.F. are flipflops which are set by a pulse on an input line S and reset by a pulse on an input line R. The remaining rectangles perform the operations indicated by their legends. A heavily shaded line with a circle therearound indicates a plurality of conductors interconnecting the blocks illustrated. The majority of these lines carry digital signals indicative of a specific character. A lightly shaded line indicates a single electrical conductor which carries various timing or information pulses.

In FIGURE 5, a detailed block diagram of the control system is illustrated. Digital information which identifies the characters to be assembled by the linecasting machine is contained on a program tape 87 which is read by tape reader 55. A typical program tape has continuous tape feed holes 88 punched down the center of the tape. Each character is identified by a plural channel, or bit, digital code 89 punched across the width of the tape in line with each tape feed hole 88.

A plurality of output lines 90, one for each channel on the tape, have signals thereon indicating the presence or absence of a hole along the width of tape being read at that instant by reader 55. These digital signals on lines 90 are coupled to decoder 56 which energizes the corresponding solenoid for releasing a matrix from the magazine. Lines 90 are also coupled to the input of memory 57, which stores the digital signal being read.

The apparatus within broken lines 92 generates a signal which causes the tape reader 55 to step the program tape in a forward (FWD) direction and directs the character information on lines 90 into separate storage locations in memory 57. The digital output signal, coupled to decoder 56, also causes the corresponding matrixes to be released from the magazine and assembled in the assembling elevator.

An elevate code is punched in the paper tape at the end of each line of characters to be assembled by machine 20. After the control system steps the tape past the last character in a line, the elevate code is read by reader 55, producing an elevate digital signal on output lines 90 which is stored in the last storage location in memory 57. At the same time, decoder 56 identifies the elevate command, and generates an output signal on a line 93, seen in the lower left hand corner of FIGURE 5.

The apparatus generally within dotted lines 95 is responsive to the output signal on line 93 to stop tape reader 55 from further movement, and also to couple the elevate signal to the elevate solenoid 96 in the linecasting machine. The energization of solenoid 96 causes the assembling elevator to raise the assembled line of matrixes to the level of the delivery channel. At the same time, the first character signal stored by memory 57 is unloaded on a plurality of memory output lines 97.

Once elevate solenoid 96 is energized, the linecasting machine automatically conveys the assembled line of mats to the casting position. As the assembled line is conveyed along the delivery channel, the first assembled mat passes the optical mat reader, causing photo transistors 74 to generate an output signal on conductors 84. The apparatus contained within dotted lines 98 couples the read indicia signal on lines 84 to the comparison portion of the control system.

Comparison circuit 60, which includes the apparatus contained within dashed lines 100, compares the signal from the photo transistors with the first character signal on memory output lines 97. If these two signals match, a COMPARE signal is generated on a line 101. The COMPARE signal causes the next character signal stored in memory 57 to be coupled to output lines 97. This operation occurs during the period of time it takes a single matrix to pass slot 82 (seen in FIGURE 4) on the optical mat reader.

As the next assembled matrix passes photo transistors 74, another signal representative of the indicia is generated and coupled to comparison circuit 60. If this indicia signal matches the new signal now on lines 97, a COMPARE signal is again generated. Each COMPARE signal steps the next succeeding digital signal stored in memory 57 to the comparison circuit 60. The COMPARE signal generated by the last assembled matrix, steps the elevate signal out of memory 57. The stored elevate signal actuates a cast solenoid 102 in the linecasting machine, causing a slug to be cast from the line of matrixes. The stored elevate signal also restarts tape reader 55 in the forward direction, causing the next line of characters to be assembled by the machine.

If the indicia signal read by photo transistors 74 is not identical with the character signal on memory output lines 97, indicating an error in the assembled line, a $\overline{\text{COMPARE}}$ (NOT COMPARE) signal is generated on line 104. The $\overline{\text{COMPARE}}$ signal clears all the remaining signals stored in memory 57, and causes tape reader 55 to reverse direction. The control system drives the program tape backwards until the start of the line assembled with an error is reached. At this time, the tape is driven forward, causing the line to be assembled again by the linecasting machine.

Since memory 57 has been cleared, no ELEVATE signal is produced on lines 97, and cast solenoid 102 is not energized. The linecasting machine automatically positions the assembled line in front of the mold disc, however, no slug is cast. At the end of the period of time necessary to cast a slug, the linecasting machine automatically conveys the assembled line to the distributing mechanism, returning the individual matrixes to their storage positions.

Reject counter 61 counts this unsuccessful attempt to assemble a line without error, as indicated by the $\overline{\text{COMPARE}}$ signal on line 104. After the third unsuccessful attempt is counted, a third REJECT signal on a line 105 shuts down the linecasting machine. If one of the attempts to reassemble the line is successful, an error-free slug is cast, the count in reject counter 61 is cleared, and the control system assembles the next line of characters on the program tape.

The specific operation of the circuit of FIGURE 5 will now be described in detail. It will be assumed that tape reader 55 is stopped, and the preceding line has been assembled without an error. At this time, as will be explained in more detail below, a pulse is coupled through an OR gate 108, in the upper left hand corner of FIGURE 5, to AND gates 109 and 110. One input of AND gates 109, 110 is energized by an output on the START line of a flip flop 112. The second input of AND 110 is energized by a signal on the FWD line of a flip flop 113. The second input of AND 109 is not energized. As a result, the pulse from OR 108 passes through AND 110 to the FWD input of tape reader 55, stepping the program tape to the next feed hole, i.e., the first code for the line to be assembled.

This stepping motion produces a negative-going feed hole pulse which is coupled from tape reader 55 to a pulse inverting NOT gate 115. The output pulse from NOT 115 is coupled to a pair of DELAY units 116 and 117. The output from DELAY 116, on line 118, produces a STROBE signal. Since flip flop 113 has an FWD output, the STROBE signal passes through an AND gate 120, producing a FUNC GATE signal.

The feed hole signal also passes through DELAY 117, and a NOT gate 121 for inverting its polarity, to an AND gate 122. Since the FWD signal and the STROBE signal are also present at this time on the other inputs of AND 122, a CHAR STROBE signal is generated if a $\overline{\text{FUNC}}$ signal is present.

The $\overline{\text{FUNC}}$ signal is derived from function block 124, located within dotted lines 94. The block 124 represents the function outputs from decoder 56. While the program tape remains at the first tape feed hole, a continuous digital output signal is obtained on lines 90. This digital signal may represent either a character to be assembled, or a special "function" control signal which in general indicates the manner in which a matrix is to be assembled. For example, the function signal may indicate whether the upper or lower rail of a matrix is to be used, or whether the character is shifted or unshifted.

If one of these special signals is present, it is gated through function block 124 by the FUNC GATE signal from AND 120, to a pair of OR gates 125 and 126. OR 125 therefore has an output signal, FUNC DRIVE. However, assuming the present digital signal represents a character, the absence of an output from OR 126, coupled through a NOT gate 127, causes a $\overline{\text{FUNC}}$ signal to be present (indicating a character signal).

Returning to AND 122, the presence of the $\overline{\text{FUNC}}$ signal allows the gate to pass a CHAR STROBE signal. This signal is delayed by a DELAY unit 128, in the upper left hand corner of FIGURE 5, and thereafter simultaneously passed to OR gate 108 and to an AND gate 129. Since a NOT gate 130 normally has an output signal present on the other input of AND 129, a CHAR signal is formed. NOT 130 receives an input signal, and hence blocks AND 129, only when the tape reader indicates a sprocket hole is present without an additional information code, to prevent a tape feed signal without character or function information from being loaded into the memory.

The CHAR signal is coupled through an OR gate 132 associated with memory 57 to the "load" input of the memory, causing memory 57 to load the digital signal present at this time on lines 90. Thus, the digital signal on each of the six channels of the program tape is stored in the first memory position.

The signal at OR 108 is passed during this same time through AND 110 to the FWD input of tape reader 55, driving the program tape forward to the next tape feed hole. The above described cycle of operation is now repeated, i.e., the tape feed signal causes the character signal now on lines 90 to be loaded into a new storage position in the memory, and thereafter steps the tape to the next hole. In this manner, each character signal is stored by the memory and at the same time coupled to decoder 56, causing the corresponding matrix to be dropped from the storage magazine and assembled by the machine.

When the digital signal on lines 90 represents a function, there is no $\overline{\text{FUNC}}$ output of NOT 127 and a FUNC DRIVE signal from OR 125 is generated instead. The absence of the $\overline{\text{FUNC}}$ signal blocks AND 122, preventing the CHAR STROBE signal from being generated.

Assuming for example that the function indicates that a spaceband SB is to be dropped, function block 124 has an SB signal output. This signal is passed through a DELAY unit 133 to cause the FUNC DRIVE signal to be generated. The SB signal is also coupled to OR 132 in the LOAD input of memory 57, causing the digital signal on lines 90, representative of a spaceband, to be loaded into the memory.

The FUNC DRIVE signal is coupled through an OR gate 134, in the upper left hand portion of FIGURE 5, to OR 108. This signal takes the place of the CHAR STROBE signal, and in a similar manner now passes through AND 110 to the FWD input of tape reader 55. It is thus noted that when a function is present, the signal which drives the tape reader forward follows a different path from that followed when a character signal is present. This is necessary because the linecasting machine mechanically handles the function signal in a different manner, and the time period which must occur before the machine can handle a new command is different.

After the program tape has been stepped through a complete line and loaded in memory 57, the last character or function in the line drives the tape forward to the next tape hole position, which contains the "elevate" (EL) code. Tape reader 55 generates a digital signal on lines 90, which is passed to decoder 56 to produce an elevate signal on line 93, in the lower left hand corner of FIGURE 5. At the same time, the tape feed hole generates the STROBE signal, which in conjunction with the signal on line 93 is gated through an AND gate 136. The output of AND 136, called ELEVATE, is coupled to OR 126, preventing the $\overline{\text{FUNC}}$ signal from being generated. This in turn blocks AND 122, preventing the CHAR STROBE signal from being generated. It should be observed that ELEVATE is coupled only to OR 126, and not to OR 125. As a result, no FUNC DRIVE signal is generated. Since neither the CHAR STROBE or FUNC DRIVE signal is present at OR 108, no signal is passed to the driving inputs of tape reader 55, and the program tape remains stopped.

The output from AND 136 also passes through an AND gate 137, since the FWD signal is present, producing an output on a line 138. A portion of this output is coupled to OR 132 causing the elevate digital signal on lines 90 to be loaded into the memory.

The output on line 138 is also coupled to a delay unit 139 for producing an EL signal after the period of time necessary to load the memory has elapsed. The EL signal is coupled to an OR gate 141 associated with a "counter" input of memory 57. A signal on the counter input resets the internal memory counter, which has stepped the incoming digital signals to the correct positions in the memory, in anticipation of the memory readout operation.

Another portion of the EL signal is coupled through a DELAY unit 142, producing a signal which actuates the elevate solenoid 96 in the linecasting machine. As a result, the assembled line of matrixes is conveyed toward the casting mechanism.

The output signal from DELAY 142 is also coupled to an OR gate 143 associated with an "unload" input of memory 57. This signal causes the first digital signal stored in the memory to be unloaded on memory output lines 97, awaiting the passing of the first matrix past photo transistors 74.

As the first assembled matrix is conveyed past the optical mat reader, signals are generated on lines 84 representative of the digital code on the matrix. If the matrix is correct, this code is identical with the code on the program tape for that character, and hence identical with the digital signal on line 97 at this time. Lines 84 are coupled to a squarer unit 45 for reshaping the pulses from the photo transistors.

In addition to the six channel indicia on each matrix, labeled channels 0 through 5, an additional channel which always carries a dot is provided to indicate when each matrix is in front of the photo transistors. The squarer output corresponding to this channel passes to a CHANNEL 6 block 146, which opens a gate 147 connected to the output of squarer 145. As a result, the digital indicia signal passes to a register 149 which stores the indicia signal.

The output from gate 147 is also coupled through an OR gate 150 to a DELAY unit 151 for producing timing signals. One output from DELAY 151 is used to reset CHANNEL 6 block 146, thereby closing gate 147. Another output, on a line 152, is coupled to a comparison unit 154 for characters, and a related SB compare unit 155 for spacebands.

Comparison unit 154 compares the digital signal from register 149 with the digital signal on memory output line 97. If corresponding parts of the signals match, a signal is passed to an output line 156.

It will be recalled that the spacebands are not coded with indicia. The reference side of the spacebands are highly polished and reflect light back to all the photo transistors. For this reason, the digital signal from register 149 does not match the signal on lines 97 if a spaceband is present, and no output is produced on line 156.

The output lines 97 which carry a signal when a spaceband is present are connected through a plurality of lines M to SB compare unit 155. The output lines of register 149 which have a signal when a spaceband is present are similarly connected to SB compare unit 155. When all the input lines to unit 155 have the correct signals thereon, an output signal is produced on a line 157, indicating a spaceband is present in the proper position in the assembled line.

The signal on line 156, indicating a character comparison, or the signal on line 157, indicating a spaceband comparison, is passed by OR gate 160, forming a COMPARE signal on line 101. This COMPARE signal is coupled to an OR gate 161 for resetting register 149. A portion of the COMPARE signal is also coupled to OR 143 of memory 57, thereby unloading the next stored digital signal onto output lines 97.

As the next assembled matrix passes the photo transistors, the above described operation is repeated. After each COMPARE signal, register 149 is reset, and the next stored digital signal is connected to comparison block 154.

After the read indicia signal on the last assembled matrix matches the stored digital signal, the COMPARE signal unloads the last storage position containing the elevate signal on output lines 97. Since each storage position in memory 57 has been unloaded, the memory is now clear. A plurality of lines connects the lines 97 having a signal when elevate is present to an AND gate 163. The output signal from AND 163 energizes cast solenoid 102, causing the assembled line of matrixes to be cast into a slug by the line casting machine.

The output signal from AND 163, which is inverted by a NOT gate 164, interrupts the normally continuous output signal of NOT 164, labeled GOOD LINE. A portion of the GOOD LINE signal is coupled to OR 141 of memory 57, thereby resetting the memory counter. Another portion is coupled to OR 134, in the upper left portion of FIGURE 5, producing a pulse which travels through OR 108 and AND 110 to tape reader 55, thereby driving the previously stopped program tape forward to the first character on the next line to be assembled.

If the line of assembled matrixes has an error, no signal is obtained on either lines 156 or 157, and hence no signal exists on line 101. As a result, a NOT gate 165, coupled to line 101, has an output signal which is coupled to an AND gate 166. AND gate 166 is also coupled to the GOOD LINE signal, and to a timing signal T from delay unit 151. Signal T is present at the same time when a COMPARE signal would normally occur on line 101. As a result, signal T gates the output from NOT 165 to line 104, producing a $\overline{\text{COMPARE}}$ signal. Reject counter 61, coupled to line 104, counts the number of times the $\overline{\text{COMPARE}}$ signal occurs.

The $\overline{\text{COMPARE}}$ signal is coupled to the clear input and to OR 141 of the memory. The presence of this signal resets the internal counter, and clears all the remaining storage positions in memory 57. Since the elevate signal stored in memory 57 is cleared, no output signal is obtained from AND 163, thereby preventing the energization of cast solenoid 102. The assembled matrixes are automatically conveyed by the line casting machine to the cost position. However, no metal is forced into the casting edge, and no slug is formed. After the period of time necessary to cast has elapsed, the line casting machine automatically conveys the assembled matrixes to the distributing mechanism, where they are returned to the individual channels 24.

The $\overline{\text{COMPARE}}$ signal is coupled to flip flop 113, interrupting the FWD signal and producing a REV signal, coupled to AND 109. The interruption of the normally present FWD signal appears as a pulse to OR 134, which passes the pulse to OR 108. Since AND 110 is now blocked, the pulse from OR 108 passes through AND 109 to the REV input of tape reader 55, driving the program tape backward to the preceding tape feed hole. The preceding hole now produces a feed hole signal, delayed by DELAY 116 to form the STROBE signal. Since no FWD signal is present, AND gates 120 and 122 are blocked. The STROBE signal passes through an AND gate 168, in the left hand portion of FIGURE 5, due to the presence of the REV signal. This pulse is passed through OR gates 134 and 108, again driving tape reader 55 backward. The above described operation is self-sustaining, causing the program tape to back up toward the start of the line assembled with an error.

Tape reader 55 is driven backward past the first character in the line to be reassembled, to the coded elevate signal at the end of the preceding line. The ELEVATE signal is coupled by decoder 56 to line 93, and is gated through AND 136 by the STROBE signal. The ELEVATE signal from AND 136 is blocked at AND 137, since the FWD signal is not present at this instance.

The ELEVATE signal is coupled to flip flop 113, causing the FWD signal to be generated just after the ELEVATE signal ceases at AND 137. However, before flip flop 113 changes states, the STROBE signal is gated through AND 168. While the pulse from AND 168 is traveling through OR gates 134 and 108, flip flop 113 changes state, and AND 110 is again energized by the FWD signal. Therefore, this pulse passes through AND 110, driving tape reader 55 forward to the first character. The line of characters is now assembled and compared in the same manner as previously described for a new line.

If the reassembled line has no errors, cast solenoid 102 is energized, and the interrupted GOOD LINE signal resets reject counter 61. If an error is detected, the control system again rewinds the tape and assembles the line. If the third attempt to assemble the line without an error fails, the output from reject counter 61, coupled through a NOT gate 169, interrupts a 3rd REJECT signal on line 105. This interrupted signal appears as a pulse to an OR gate 170, in the left hand portion of FIGURE 5. The output from OR 170 causes flip flop 112 to change states, producing a STOP signal which shuts down the line casting machine.

In FIGURES 6 to 9, the detailed logical circuitry corresponding to the apparatus within dotted lines 92, 94, 98 and 100, respectively, is illustrated.

*Detailed logic circuitry*

Figure 6:
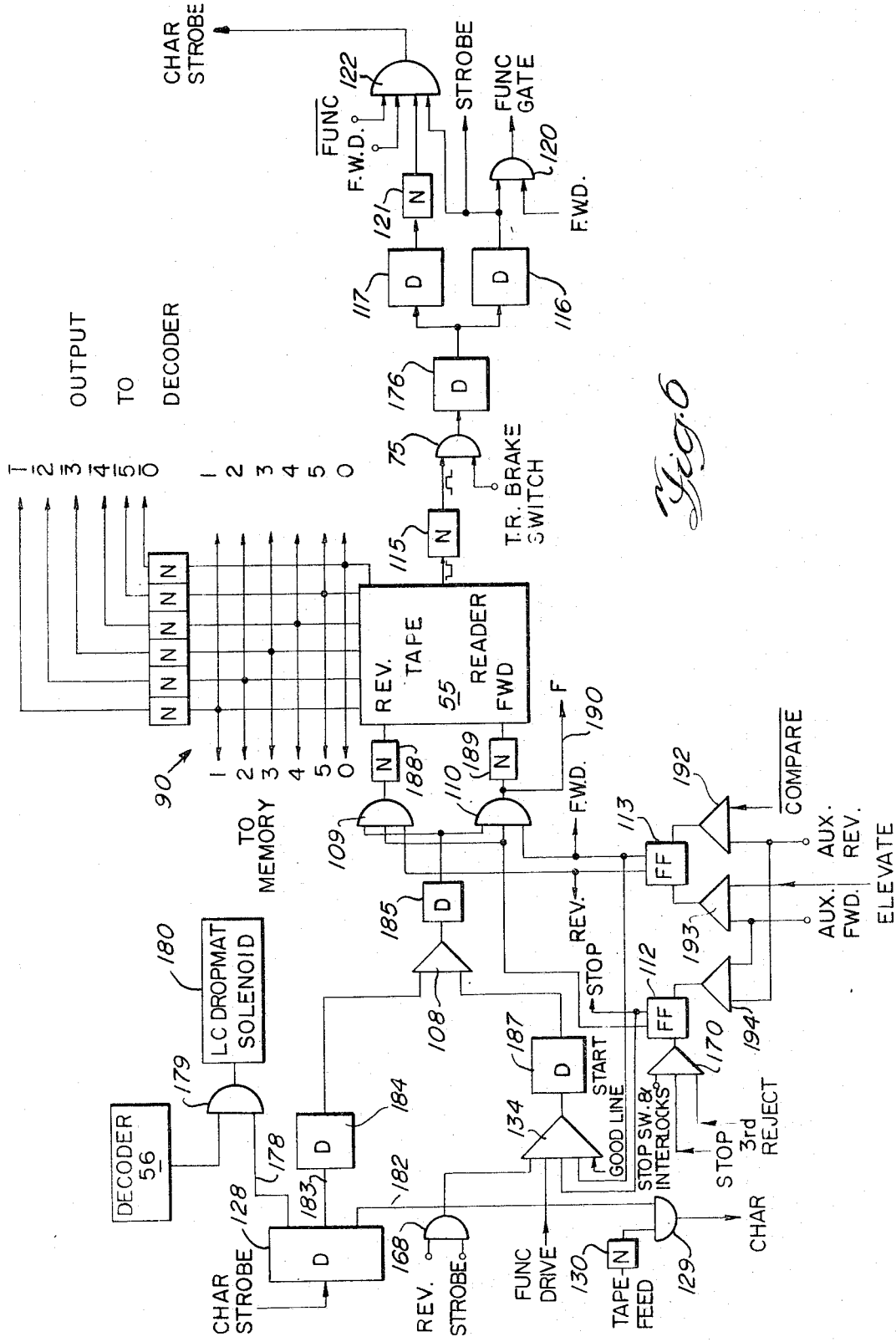
FIGURES 6 to 9 are detailed schematic diagrams of the logical circuitry representing the portions of the system indicated by broken lines in FIGURE 5.
Figures 10, 11:
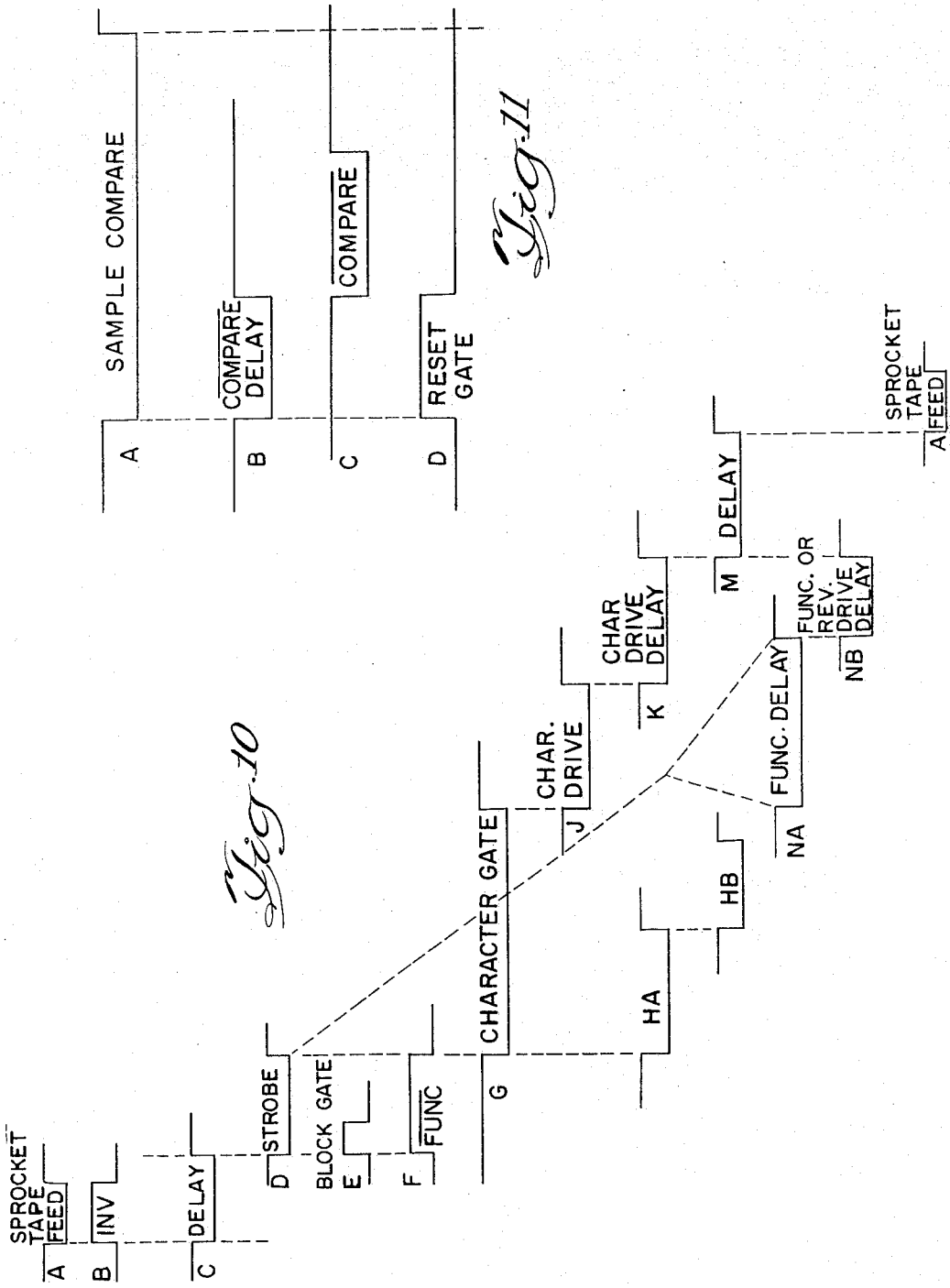
FIGURE 10 is a diagram illustrating the time relation between various timing signals in the circuit of FIGURE 6.
FIGURE 11 is a diagram illustrating the time relation between certain other timing signals utilized in the system.

In FIGURE 6, the logic circuitry within dotted lines 92 in FIGURE 5 is illustrated in more detail. The various drive and timing signals used in conjunction with tape reader 55 are illustrated in FIGURE 10.

The negative going TAPE FEED HOLE pulse A from tape reader 55 is inverted B by NOT 115. This signal is coupled to an AND gate 175. The other input to AND 175, the tape reader brake switch signal, indicates that tape reader 55 is operating properly. The output from AND 175 is coupled to a DELAY unit 176, producing an output, C, coupled to DELAY units 116 and 117. The output from DELAY 116 is the STROBE signal, D.

The output from DELAY 117 is inverted by NOT 121, producing a positive going signal, E, which prevents the CHAR STROBE signal from being generated at the beginning of the STROBE signal. When a function is present, the $\overline{\text{FUNC}}$ signal F is positive going, for preventing the CHAR STROBE signal from being generated.

The CHAR STROBE signal D is coupled to DELAY unit 128. One output from DELAY 128, on a line 178, serves as a CHARACTER GATE signal, G. This signal is coupled to an input of AND gate 179, for passing the CHARACTER DROP COMMAND signal from decoder 56 to the corresponding drop mat solenoid 180 in the line casting machine. While only one AND gate 179 and one drop mat solenoid 180 are illustrated in FIGURE 6, it will be realized that these components are provided for each character output from decoder 56.

Decoder 56 is coupled to the output lines 90 from tape reader 55, composed of channels 0 through 5 and their corresponding negations and has a separate output for each character and function.

The CHAR STROBE signal, FIGURE 10HA, is delayed by DELAY 128, producing on another output line 182 a pulse, FIGURE 10HB, coupled to AND 129. This produces the CHAR signal for loading memory 57.

When the CHARACTER GATE signal, G, has terminated, DELAY 128 has a CHAR DRIVE signal output, J, on a third output line 183. The CHAR DRIVE signal is delayed by a DELAY unit 184, producing a CHAR DRIVE DELAY signal, K, which is coupled to OR 108. The output from OR 108 is delayed by a DELAY unit 185, producing a DELAY signal, M, which is finally coupled to AND gates 109 and 110 for stepping the tape reader to the next feed hole, again producing a sprocket TAPE FEED HOLE pulse, A.

If the coded digital signal represents a function, the FUNCTION signal, F, blocks AND 122, preventing signals 10HA, HB, G, J, and K, from being generated. Instead, the STROBE signal coupled to AND 120 produces the FUNC GATE signal for energizing the function circuitry. A FUNC DELAY signal, NA, is generated by the function circuitry, immediately preceding the termination of STROBE signal D. As previously explained, this produces the FUNC DRIVE signal coupled to OR 134 in FIGURE 6. The output from OR 134 is connected to a DELAY unit 187, producing a FUNC or REV DRIVE DELAY signal, NB. This signal is coupled to OR 108, producing the DELAY signal M, already described. As is apparent from FIGURE 10, tape reader 55 is stepped to the next feed hole in a shorter period of time when a function is present. This is possible because no matrix is dropped by solenoid 180, allowing the time delay periods caused by mechanical limitations in the line casting machine to be eliminated.

Between the drive inputs to tape reader 55 and the AND gates 109 and 110, a pair of NOT gates 188 and 189 are inserted to invert the polarity of the driving pulse. A line 190 having an output signal F thereon is connected between AND 110 and NOT 189. Output F is coupled to memory 57.

The $\overline{\text{COMPARE}}$ signal is coupled to flip flop 113 through an OR gate 192. An AUX REV signal, provided from a push button (not illustrated) for manually reversing the tape reader, is also coupled to OR 192.

The ELEVATE signal, for resetting flip flop 113 to its FWD output, is coupled through an OR gate 193. An AUX FWD signal for manually restarting the tape reader in a forward direction is similarly coupled to OR 193.

Both AUX signals are coupled to OR gate 194 which resets flip flop 112 to its START state. OR gate 170 is coupled to safety interlock switches on the line casting machine for generating the STOP signal from flip flop 112. The STOP signal is coupled to OR 134, and causes a pulse to be generated when the stopped machine is manually restarted, in a manner similar to that previously described for the FWD signal input to OR 134.

Figure 7:
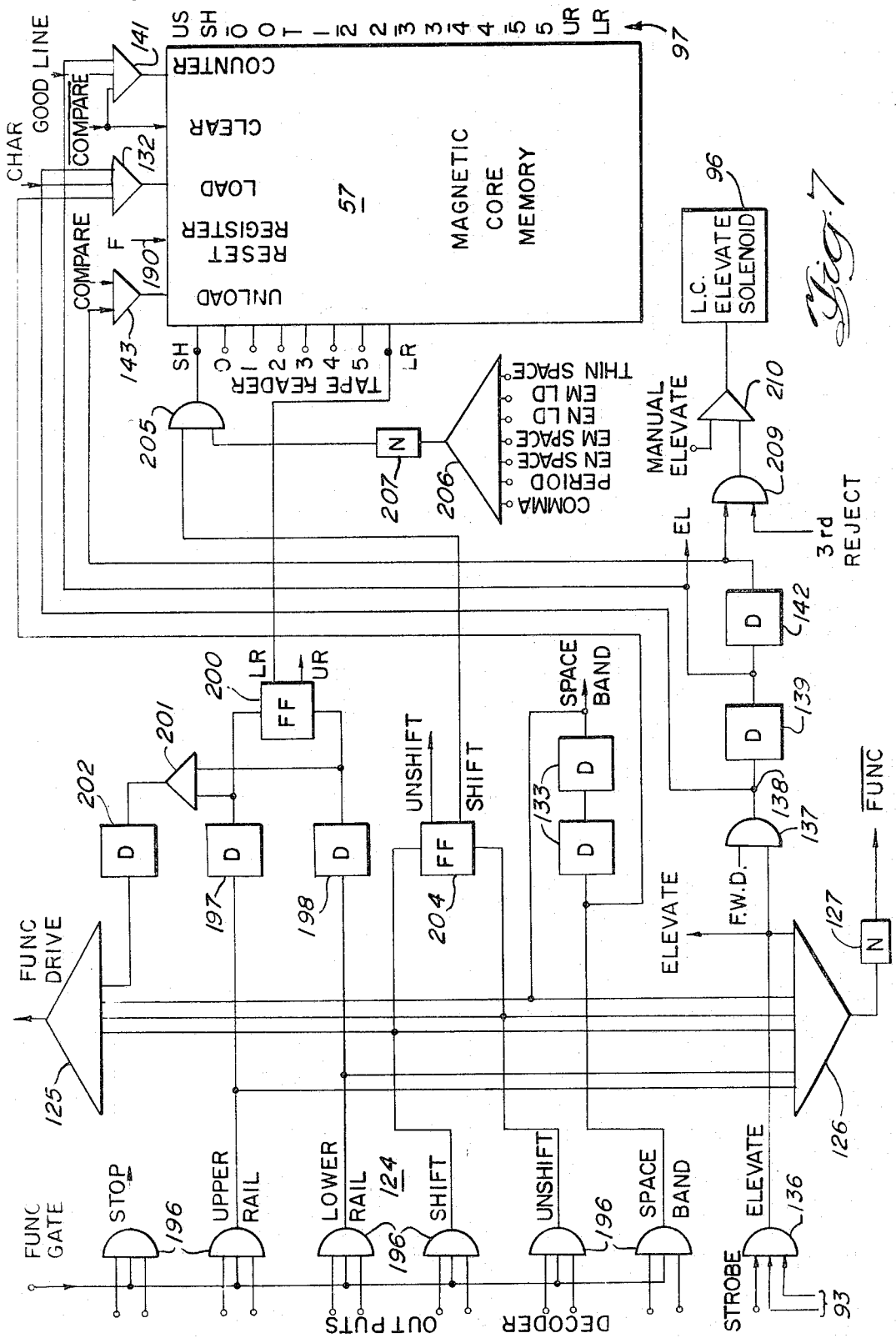

In FIGURE 7, the function and memory circuitry contained within the dotted lines 94 of FIGURE 5 are illustrated in detail. Magnetic core memory 57 has eight channel inputs. The first six channels, labeled 0 through 5, are from tape reader 55. The bottom channel, labeled LR, is derived from the function circuitry, and indicates whether the lower or upper rail of the selected matrix is to be aligned. The top channel, labeled SH, is also derived from the function circuitry, and indicates whether the character selected is shifted or unshifted. The shifted characters, as upper case characters, which are stored in a separate magazine, have the same indicia code as unshifted characters, with the addition of a dot.

Memory 57 has two outputs for each input, the second output being the negation of the input. In addition to the memory unload, load, clear and counter inputs, a reset register input is provided. As the signal from each storage position is stepped out of the memory, a bank of lights indicates the exact digital code on the output lines. These lights remain lit even when the control system and line casting machine are shut down after the third unsuccessful attempt to reassemble a line, to aid an operator in determining the exact nature of the error. Input signal F on line 190 clears this visual register when tape reader 55 is driven forward. Memory 57 by itself is a conventional unit. A suitable magnetic core memory for the control system is model 60M8C, manufactured by Indiana General Corp., Valparaiso, Indiana.

The function circuitry 124 is formed from a plurality of AND gates 196. These gates are a part of the output circuitry of decoder 56. When opened by the FUNC GATE signal, a single output signal from one AND 196 is obtained depending on the exact function read at that instant.

The outputs corresponding to the upper rail (UR) and lower rail (LR) are respectively coupled through delay units 197 and 198 to a flip flop 200. The LR output from flip flop 200 is connected with the LR input of memory 57. The UR output of the flip flop is connected to the line casting machine, in order to assemble the selected matrix on its upper rail. DELAY units 197 and 198 are also coupled to an OR gate 201. The output signal from OR 201, through a DELAY gate 202, is coupled to OR 125 for producing the FUNC DRIVE signal.

The shift and unshift outputs are connected to a flip flop 204. The shift output of the flip flop is coupled to an AND gate 205 connected with the SH input of memory 57. The shift and unshift outputs of flip flop 204 are also connected to the line casting machine, for controlling the magazine from which the selected matrix is released.

Certain characters, e.g., comma or period, are identical on the shifted and unshifted matrixes. The digital dot indicating shift may be eliminated from these specific matrixes by blocking AND 205 when these signals are present. For this purpose, the outputs from the decoder for each of these specific signals are coupled to an OR gate 206. In the absence of a special character, a NOT gate 207 coupled between OR 206 and AND 205 allows the SHIFT signal to pass through AND 205 to the memory 57. When a special character is present, the output signal from NOT 207 is eliminated, thereby blocking gate 205.

The spaceband output is directly connected to OR 132 on memory 57. The delayed spaceband signal, from DELAY units 133, is coupled to OR's 125 and 126, and to the spaceband solenoid in the line casting machine.

When the line casting machine is shut down by reject counter 61, it is desirable to prevent the assembled line from being conveyed to the casting mechanism, in order to aid the operator in determining the source of error. For this purpose, an AND gate 209 and an OR gate 210 are connected between DELAY 142 and elevate solenoid 96. When the 3rd REJECT signal is removed by the reject counter, AND 209 blocks the ELEVATE signal. A MANUAL ELEVATE signal is coupled to OR 210 for energizing solenoid 96 after the error is determined.

Figure 8:
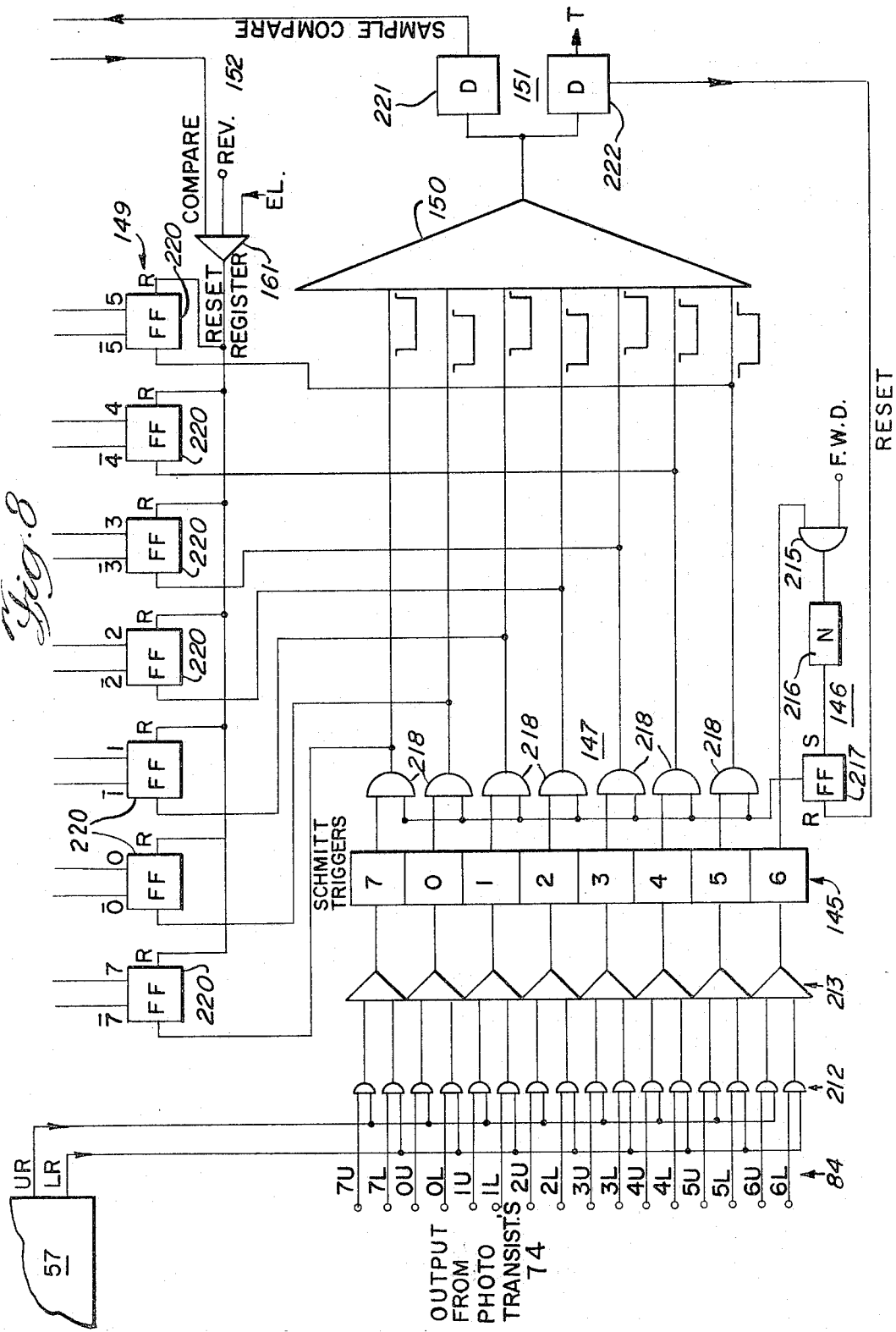

In FIGURE 8, the circuitry within dotted lines 98 of FIGURE 5 is illustrated in detail. Each output line 84 from photo transistors 74 is coupled to one of a plurality of AND gates 212. The UR and LR signal outputs from memory 57 are coupled to the AND gates corresponding to the upper and lower rail outputs from the photo transistors. Only one output line UR or LR has a signal thereon, thereby gating only the channels of the corresponding rail to a plurality of OR gates 213. The output from each OR 213 is coupled to squarer 145, consisting of a Schmitt trigger for each channel.

Each matrix carries eight channels of digital information. Channels 0 through 5 correspond to the digital code on the program tape. The sixth channel carries a dot on each matrix, for opening gate 147. The seventh channel indicates whether the matrix is shift or unshift.

The Schmitt trigger for channel six has an output coupled to an AND gate 215 in channel six circuit 146. The output from AND 215, providing a FWD signal is present, is passed through a polarity reversing NOT gate 216 to a flip flop 217.

Gate 147 is formed from an AND gate 218 for each channel carrying identifying information. One input of AND 218 is coupled to the Schmitt trigger for that channel. The other input is coupled to the output of flip flop 217, for gating the signal from the Schmitt triggers to register 149 and OR 150 when the channel six signal is received.

Register 149 has a flip flop 220 for each channel. These flip flops are reset by OR 161, which in addition to the EL and COMPARE signal inputs previously described is also coupled to the REV signal, for resetting register 149 when an error is detected.

The digital output pulses from the photo transistors do not occur at exactly the same time, as indicated by the waveforms adjacent the input lines of OR 150. The output pulse from OR 150 begins when the first digital pulse is received, and terminates at the end of the last received pulse. This timing signal is coupled to DELAY 151, consisting of a pair of DELAY units 221 and 222. The SAMPLE COMPARE signal output from DELAY 221, illustrated in FIGURE 11a, provides a long timing pulse for opening comparison units 154 and 155 in FIGURE 9. Output line T of delay 222 carries a shorter $\overline{\text{COMPARE}}$ delay signal, FIGURE 11b. This same pulse, but positive going as illustrated in FIGURE 11d, is coupled to the reset input of flip flop 217, for closing gate 147.

Figure 9:
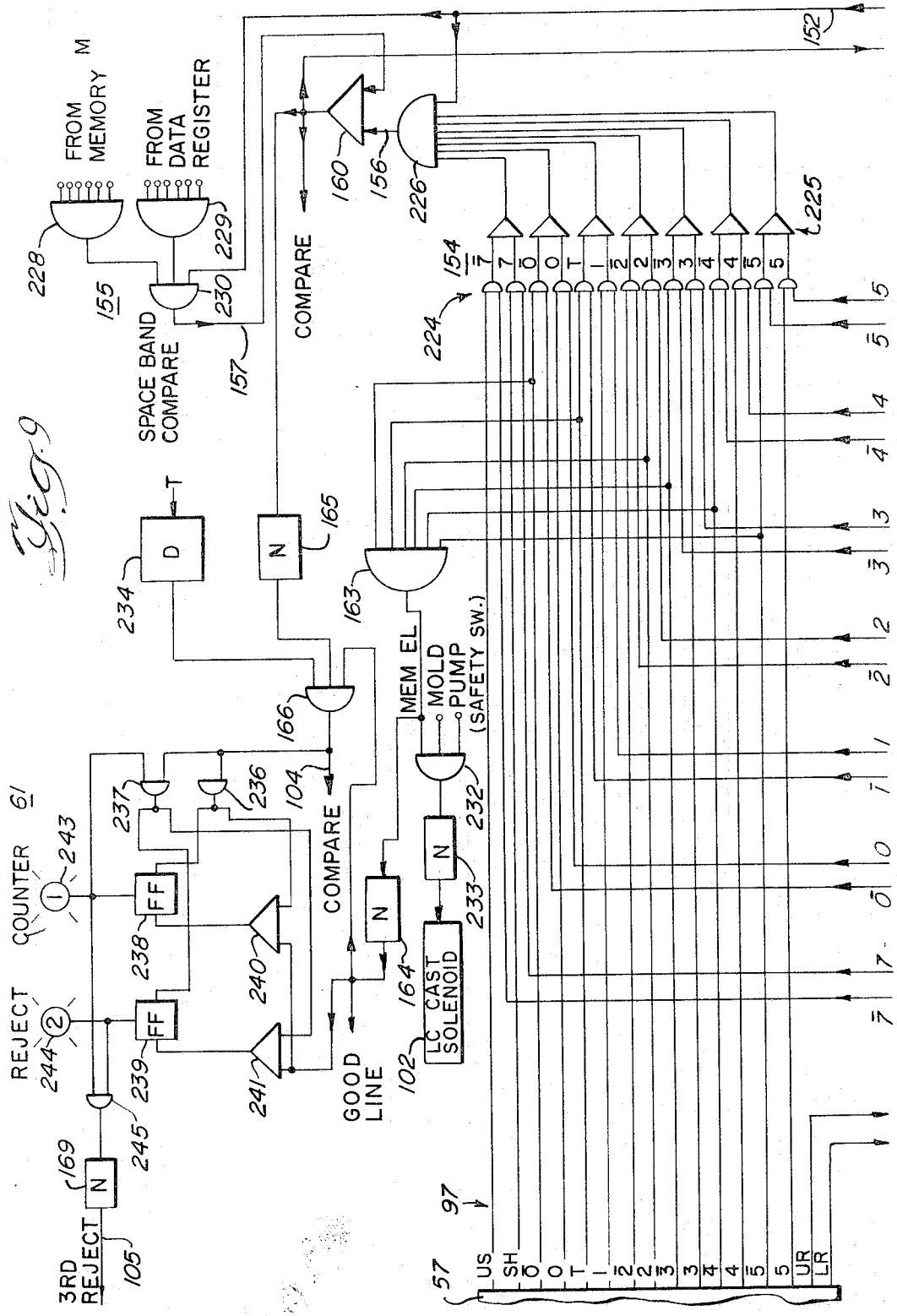

In FIGURE 9, the circuitry within dotted lines 100 in FIGURE 5 is illustrated in detail. Each of the output lines 97 from memory 57 (except channel 6) is connected to one of a plurality of AND gates 224. The output lines from register 149 are each similarly coupled to the AND gate 224 corresponding to that channel. The negated and unnegated AND gates 224 for each channel are coupled to one of a plurality of OR gates 225. An AND gate 226 has inputs coupled to each OR 225, and to line 152 carrying the SAMPLE COMPARE signal, FIGURE 11a. If all the input lines to AND 226 have signals thereon, indicating the indicia on the matrix identically matches the stored indicia, an output is obtained on line 156 at this time.

The spaceband compare circuitry 155 includes a pair of AND gates 228 and 229. The input lines of AND 228 are connected to the output lines from memory 57, defined as M, which all have a signal thereon when the spaceband code is stored. In one specific embodiment of the invention, the inputs of AND 228 were connected to the output lines 97 corresponding to $\overline{0}, \overline{1}, \overline{2}, \overline{3}, \overline{4}$, and $\overline{5}$. When a signal is present on all of these lines, AND 228 has an output coupled to a third AND gate 230.

AND 229 is connected to certain output lines from data register 149. Since the spaceband carries no code, but reflects all light signals, the inputs of AND 229 are connected to the outputs of the data register corresponding to 0, 1, 2, 3, 4, and 5. The output from gate 229 is similarly coupled to AND 230. When the SAMPLE COMPARE signal, FIGURE 11a, is received on line 152, AND 230 passes a signal to line 157, indicating a spaceband compare.

AND 163 has an output when the elevate code is stepped out of memory 57, as previously described. Therefore, the presence of a signal on lines 97 corresponding to $\overline{0}, \overline{1}, \overline{2}, \overline{3}, \overline{4}$, and $\overline{5}$ (the elevate digital code) produce an output MEM EL from AND 163.

The MEM EL output signal is coupled to an AND gate 232 which passes the signal if certain safety switches on the line casting machine, e.g., connected to the mold and pump apparatus, indicate that the slug can be cast. AND 232 energizes cast solenoid 102. A NOT gate 233 is inserted between AND 232 and solenoid 102 for inverting the pulse to a form usable by the cast solenoid.

The MEM EL output is also coupled to NOT 164, the output of which is the GOOD LINE signal.

Line T, carrying the $\overline{\text{COMPARE}}$ DELAY signal from DELAY 222 of FIGURE 8, is coupled to a DELAY unit 234. The output from this DELAY is the $\overline{\text{COMPARE}}$ signal, illustrated in FIGURE 11c, which allows AND 166 to be gated only during this period of time during which the COMPARE signal should be present. The output from NOT 165 blocks AND 166 if the COMPARE signal is present. If the COMPARE signal does not occur after the time allowed for the various digital signals to pass through the matching circuitry, line 104 has a $\overline{\text{COMPARE}}$ signal thereon.

When an ELEVATE signal is stepped out of memory 57, no COMPARE signal should be formed. To prevent a $\overline{\text{COMPARE}}$ signal from being generated at this time, AND 166 is also coupled to the GOOD LINE signal, which is interrupted when the MEM EL signal is detected.

Reject counter 61 is formed from a flip flop counting circuit. The $\overline{\text{COMPARE}}$ signal from line 104 is coupled to a single input AND gate 236, and an AND gate 237. The outputs from these gates are connected in a conventional counting circuit to flip flops 238 and 239, and OR gates 240 and 241. When the first $\overline{\text{COMPARE}}$ signal is detected, flip flop 238 has an output which is coupled to a visual indicating light 243. When the second $\overline{\text{COMPARE}}$ signal is detected, flip flop 238 is reset and flip flop 239 has an output, coupled to an indicator light 244. When the third $\overline{\text{COMPARE}}$ signal is received, both flip flops have outputs, which are passed through an AND gate 245 to NOT 169, for terminating the 3rd REJECT signal on line 105. The GOOD LINE signal is connected to OR 241, for resetting the reject counter when an ELEVATE signal is received.

The control system compares the actual character of each assembled matrix with each selected character. This sequential character check on each part of an assembled line allows any of the previously described errors to be detected. For example, the system detects the assembly of too many matrixes, or a single matrix of the wrong character with equal ease. A wrong rail, or a transposed spaceband are still other examples of dissimilar types of error which the control system eliminates.

We claim:

1. In a line casting machine having matrixes carrying castable characters: control means for assembling selected matrixes and casting a slug of type from said selected matrixes; indicia means on each matrix in addition to said castable characters; means for developing a signal representative of said indicia; and means responsive to said signal for modifying the operation of said control means.

2. In a line casting machine having character carrying matrixes: means for assembling selected matrixes to form a line and means for casting a slug of type from said selected and assembled matrixes; means for using coded information to actuate said machine to select desired character matrixes to form a line; means for storing information uniquely identifying each selected matrix; and means for comparing the assembled matrixes with said stored information.

3. The machine of claim 2 including means responsive to said comparing means for actuating said casting means if the assembled matrixes agree with the stored information.

4. In a line casting machine having character carrying matrixes: means for assembling selected matrixes to form a line and means for casting a slug of type from said selected and assembled matrixes; means for using coded information to actuate said machine to select desired character matrixes to form a line; means for storing information identifying the selected matrixes; means for comparing the assembled matrixes with said stored information; and means responsive to said comparing means to dispose of the assembled matrixes and reset the line if the assembled matrixes do not agree with the stored information.

5. The line casting machine of claim 4 wherein the means for using the coded information includes a tape reader and the machine includes means to reverse the reader and re-read the tape for the line to be reset.

6. The line casting machine of claim 4 including means for counting the unsuccessful attempts to set a line and for shutting down said machine after a predetermined number of unsuccessful attempts.

7. In a line casting machine having means for assembling a line of selected matrixes and program means for controlling said assembling means, a control system comprising: means for detecting an error in said line; and means responsive to detection of an error by said detecting means for causing said line to be reassembled by said program means.

8. The control system of claim 7 including means for counting the number of times said line is reassembled, and means responsive to a predetermined count in the counting means for shutting down said machine.

9. In a line casting machine having means for assembling a line of selected matrixes, a control system comprising: tape reader means for controlling the assembly of said line in response to a program tape moved in a forward direction; means for detecting an error in the line of matrixes assembled by said machine; means responsive to said error means for causing said tape to be moved in a reverse direction when an error is detected; means to stop the reverse moving tape when the start of the line assembled with said error is detected; and means to cause said tape to move forward to reassemble said line.

10. In a line casting machine having a storage area for matrixes representative of characters, means for assembling a line of matrixes selected from the storage area, and galley means for holding printable characters, a control system comprising: means for detecting an error in the line of matrixes assembled by said machine; means for conveying the selected matrixes back to the storage area even though a line of selected matrixes has an error; and means responsive to detection of an error by said detecting means for preventing printable characters representative of the assembled line conveyed to the casting means from reaching said galley means.

11. In a line casting machine having means for assembling a line of selected matrixes, a control system comprising: means for casting a slug of type from a line assembled by said assembling means; means for detecting an error in the line of matrixes assembled by said machine; means for conveying the assembled line to said casting means even though an error has been detected in the assembled line; and means responsive to detection of an error by said detecting means for preventing the casting of a slug from the assembled line conveyed to the casting means.

12. In a line casting machine having means for assembling a line of selected matrixes, a control system comprising: tape reader means for controlling the assembly of said line in response to a program tape; means for casting a slug of type from a line assembled by said assembling means; means for conveying an assembled line to said casting means, said tape reader developing an elevate signal at the end of the line for activating said conveying means; means for storing said elevate signal; and means for connecting the stored elevate signal to said casting means when the line of assembled matrixes is without error, said stored elevate signal actuating said casting means to cast a slug from the assembled line.

13. In a line casting machine having a storage area for matrixes representative of characters, means for releasing a matrix from said storage area in response to the selection of a character, and program means for controlling the selection of characters, a control system comprising: means including said program means for producing a first signal representative of the selected characters; indicia on each matrix representative of the character thereof; means for developing a second signal representative of the indicia on each of the matrixes released by said program means; memory means for storing one of said first and second signals; comparison means for comparing the stored one signal with the other of said first and second signals; and error means coupled to said comparison means for developing an error signal when said one and said other signals do not match.

14. The control system of claim 13 including means responsive to said error signal for clearing said memory.

15. The control system of claim 13 including means responsive to said error signal for reselecting the matrixes assembled with an error.

16. The control system of claim 13 including counting means responsive to said error signal for recording the unsuccessful attempts to release matrixes whose character match the selected character.

17. The control system of claim 13 wherein said comparison means develops a COMPARE signal when the first and second signals match.

18. The control system of claim 17 wherein said memory means stores said first signal in individual locations for each selected character, means connecting one of said locations to said comparison means, and said memory means being responsive to the COMPARE signal for connecting a different storage location to said comparison means.

19. The control system of claim 17 including casting means for forming a slug from an assembled line, and means responsive to the COMPARE signal for the last selected character in a line for activating said casting means.

20. In a line casting machine having assembling means for composing a line of matrixes representative of selected characters, means for casting a slug of type from an assembled line; conveying means for causing said assembled line to move through a path to said casting means, and tape reader means for releasing matrixes to said assembling means in response to a program tape, a control system comprising: indicia on each matrix representative of the character thereof; said tape reader including means for developing a character signal representative of each character on the program tape; memory means having a plurality of storage positions, each capable of storing said character signal; gating means for developing a gating signal for stepping each character signal in a line on said tape into different storage positions in said memory; start means responsive to the end of the line to cause said conveying means to move the assembled line through said path; means located along said path for developing an indicia signal representative of the indicia on each of the assembled matrixes as said conveying means moves the assembled line past said means; and comparison means coupled to said reading means and to one of said storage positions in said memory for developing a COMPARE signal when said indicia signal and said character signal are identical, said COMPARE signal coupling a different storage position to said comparison means.

21. The control system of claim 20 including spacebands without said indicia thereon, and special comparison means responsive to a stored character signal representative of a spaceband and the indicia signal produced by an assembled spaceband for developing said COMPARE signal.

22. The control system of claim 20 including error means connected to said comparison means for developing a NOT COMPARE signal when said indicia signal and said character signal do not match, said memory means being responsive to the NOT COMPARE signal to clear the signals stored in said storage positions.

23. The control system of claim 20 including means responsive to the signal contained in the last storage position coupled to said comparison means to actuate said gating means, causing the next line on said tape to be stepped into said memory means.

24. The control system of claim 23 wherein said means responsive to the signal contained in the last storage position coupled to said comparison means blocks said error means, preventing a NOT COMPARE signal from being developed.

25. The control system of claim 20 wherein said memory means includes register means connected to the storage position coupled to said comparison means for recording the character signal stored therein, and reset means connected to said register means for clearing the recorded character signal.

26. The control system of claim 25 wherein said reset means is connected to said gating means, for clearing the recorded character signal when the next line on said tape is stepped into said memory means.

27. In a line casting machine having matrixes carrying castable characters and means for assembling said matrixes along an upper and a lower rail, a matrix identification system comprising: a plurality of bits arranged in a digital code on each matrix, forming unique indicia representative of the character thereof, said bits being formed from the presence and absence of light reflective areas on said matrix; and optical reading means mounted on said machine for developing a digital signal representative of said indicia, including a source of light located to illuminate said indicia, and first and second light responsive signal generating means for each bit, said first and said second generating means being grouped to generate a separate digital signal for matrixes assembled along said upper and lower rail respectively.

28. In a line casting machine having means for assembling a line of matrixes representative of selected characters, and conveying means for causing said assembled line to move through a path, a matrix identification system comprising: a plurality of bits arranged to form a digital code on each matrix representative of the character thereof, said matrixes additionally carrying a gating bit; reading means mounted on said machine along said path for developing a digital signal representative of said indicia as the assembled line is conveyed therepast, including an output line for each bit on said matrixes; gating means connected to each output line carrying a character bit thereon, for blocking the passage of said digital signal; and means connected to the output line carrying said gating bit for opening said gating means when said gating bit is present.

29. The matrix identification system of claim 28 including delay means coupled to said gating means, forming a reset signal from the digital signal coupled through said gating means, and means responsive to said reset signal for blocking said gating means.

30. In a line casting machine having a storage area for matrixes representative of characters and means for releasing a matrix from said storage area in response to the selection of a character, a control system comprising: means for reading a tape carrying a plurality of codes, said codes corresponding to characters and functions to be selected, said tape reading means generating a digital signal representative of the code being read and a strobe signal; decoder means responsive to said digital signal for selecting characters and functions; a memory for storing said digital signals; a character electrical signal path for said strobe signal, for loading said digital signal into said memory and driving said tape to the next code thereon after a predetermined time delay; a function electrical signal path for said strobe signal, responsive to said digital signal when representative of a function for loading said digital signal into said memory and driving said tape to the next code thereon after a function time delay different than said predetermined time delay; means for comparing the stored digital signals with the released matrixes; and error means responsive to said comparing means for indicating when the released matrixes are different from the selected characters.

31. The control system of claim 30 including elevate means responsive to an elevate code at the end of a line of characters and functions on said tape for blocking both said character and function electrical signal paths, preventing said tape from being driven to the next code thereon.

32. The control system of claim 31 including means responsive to said elevate means for connecting the stored digital signals to said comparing means.

33. The control system of claim 31 including start means responsive to said comparing means when the released matrixes are identical with the selected characters for introducing a start pulse in one of said electrical signal paths, driving said tape to codes in the next line to be selected.

34. The control system of claim 31 including reselect means responsive to said error means for introducing a reselect pulse in at least one of said electrical signal paths, which drives said tape backwards to the start of the line released with an error.

35. The control system of claim 30 including shift means responsive to said decoder means for indicating when the function represents a shift command, and means responsive to said shift means for storing a shift digital signal in said memory.

36. The control system of claim 35 including means responsive to predetermined digital signals identified by said decoder means for blocking said shift digital signal, preventing the shift command from being stored in said memory.

37. The control system of claim 30 wherein said decoder means has a decoder output signal for selecting characters, gating means coupled between said decoder means and said line casting machine for blocking said decoder output signal, and means connecting said gating means to said character electrical signal path, said strobe signal opening said gating means for releasing the character corresponding to the code being read by said tape reading means.

References Cited by the Examiner
UNITED STATES PATENTS

| | | | |
|---|---|---|---|
| 2,955,703 | 10/1960 | Shaffstall | 199—18 |
| 3,139,178 | 6/1964 | Krause et al. | 199—18 |

ROBERT E. PULFREY, *Primary Examiner.*

W. F. McCARTHY, *Assistant Examiner.*